United States Patent
Whitworth et al.

(10) Patent No.: US 9,849,640 B2
(45) Date of Patent: Dec. 26, 2017

(54) PROCESSES FOR REPAIRING COMPLEX LAMINATED COMPOSITES

(75) Inventors: Denver R. Whitworth, North Richland Hills, TX (US); Eric W. Nottorf, Fort Worth, TX (US); Vance N. Cribb, III, Flower Mound, TX (US); Dumitru Jitariu, Flower Mound, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 13/433,106

(22) Filed: Mar. 28, 2012

(65) Prior Publication Data
US 2013/0255856 A1 Oct. 3, 2013

(51) Int. Cl.
*B29C 73/10* (2006.01)
*B29C 73/26* (2006.01)
*B29C 70/30* (2006.01)

(52) U.S. Cl.
CPC .............. *B29C 73/10* (2013.01); *B29C 73/26* (2013.01); *B29C 70/30* (2013.01); *B29C 2073/264* (2013.01)

(58) Field of Classification Search
USPC .......................................................... 156/98
See application file for complete search history.

(56) References Cited

U.S. PATENT DOCUMENTS

| 4,987,700 | A  | * | 1/1991 | Westerman et al. ........... 451/152 |
| 6,174,392 | B1 | * | 1/2001 | Reis ........................ B29C 73/06 156/58 |
| 7,628,879 | B2 | * | 12/2009 | Ackerman ...................... 156/98 |
| 2007/0079920 | A1 | * | 4/2007 | Holland .......................... 156/98 |
| 2008/0281554 | A1 | * | 11/2008 | Cork et al. .................... 702/150 |
| 2009/0234616 | A1 | * | 9/2009 | Perkins .......................... 702/184 |
| 2010/0136309 | A1 | * | 6/2010 | Normand et al. ............ 428/213 |
| 2011/0315303 | A1 |   | 12/2011 | Bird |

OTHER PUBLICATIONS definition of 'scoring' from the internet, date unknown.*
European Search Report for EP Application No. 12170363.1, dated Feb. 4, 2013, 11 pages, European Patent Office.
Hoke, Michael J., "Repair Applications, Quality Control, and Inspection," Composites, Dec. 1, 2001, pp. 893-898, ASM International, USA.
Campbell, F.C., "Bonded Repairs," Bonded Repairs, Jan. 1, 2004, pp. 501-511, Elsevier.

(Continued)

*Primary Examiner* — Jeffry H Aftergut
*Assistant Examiner* — Jaeyun Lee
(74) *Attorney, Agent, or Firm* — Kirby B. Drake; Klemchuk LLP

(57) ABSTRACT

Complex laminated composites may be repaired by removal of individual damaged plies through peeling in order to exploit the weaker interlaminar properties of these composites. Upon removal of the individual damaged plies through peeling, replacement plies may be added to restore the laminated composite. In addition, when damage extends through the thickness of a laminated composite, a plug may be used to allow plies to be replaced while maintaining contour within the repair region. A caul plate also may be used to stiffen and maintain the contour of a repair region while peeling and removing plies from the repair region.

7 Claims, 3 Drawing Sheets

(56) References Cited

OTHER PUBLICATIONS

Astrom, B.T., Chapter 5.4, "Repair, Manufacturing of Polymer Composites," Manufacturing of Polymer Composites, London, Jan. 1, 1997, pp. 340-343, Chapman & Hall, UK.

Hexcel Composites, "Composite Repair", Internet Citation, Apr. 1999, pp. 1-13, Publication No. UTC 102, retrieved from URL:http//www.hexel.com/NR/rdontyres/61392766F-6419-4487-87AA-FE6C6070DE6E/0/CompositeRepair.pdf on Aug. 23, 2007.

Office Action for related Canadian Patent Application No. 2,810,615, dated Jun. 11, 2014, 2 pages, Canadian Intellectual Property Office.

Office Action for related European Patent Application No. 12170363.1, dated May 26, 2014, 6 pages, European Patent Office.

Baker, A. A., "Repair Techniques for Composite Structures," Composite Materials in Aircraft Structures, Jan. 1, 1990, pp. 207-227, XP008103764, Longman, New York (22 pages).

\* cited by examiner

PROCESSES FOR REPAIRING COMPLEX LAMINATED COMPOSITES

FIELD OF THE INVENTION

The present disclosure generally relates to composite repair, and more particularly to processes for repair of complex laminated composites.

BACKGROUND

Composite materials are becoming more prevalent in fabrication of aircraft structures. When structural damage occurs to these composite materials, sanding or cutting of plies may be employed to make repairs, and this may be used to achieve individual steps in a stepped scarf joint repair or a continuous transition in a tapered joint repair. However, in using such techniques, it may be difficult to maintain the depth of the scarf, the definition of ply terminations, and/or the consistency of a taper angle over the entire repair area. Further, if thru damage is present, tooling may be required to maintain the contour of the part comprising the repair area, thereby requiring disassembly and removal of other parts not necessarily requiring repair so that the part comprising the repair area may fit in the tooling.

SUMMARY

Embodiments of the present disclosure may provide a method for repairing a laminated composite comprising mapping dimensions and arrangement of a plurality of plies forming the laminated composite, defining a repair region by identifying at least one of the plurality of plies that is damaged, peeling and removing the damaged plies from the repair region, wherein each of the damaged plies is separately peeled and removed, and adding at least one replacement ply to the repair region. Each of the damaged plies to be peeled and removed may be separately scored before peeling. The number of replacement plies added may be at least equal to the number of damaged plies that are separately peeled and removed. In some embodiments of the present disclosure, the number of replacement plies may be greater than the number of damaged plies that are separately peeled and removed. At least one replacement ply may be added in an overlapping manner. Further, additional replacement plies may be added to each side of the repair region to further strengthen the repair region.

The method may further include creating a repair patch and aligning and bonding the repair patch within the repair region. The repair patch may be created by forming a first layer that matches the mapped dimensions and arrangement of the plurality of plies forming the laminated composite, forming at least one additional layer that matches the mapped dimensions and arrangement of the plurality of plies forming the laminated composite, and aligning the first layer with the at least one additional layer. The method also may include introducing a caul plate to maintain the contour of the repair region while peeling and removing the damaged plies from the repair region.

Other embodiments of the present disclosure are directed to a method for repairing a laminated composite comprising locating and defining a repair region of the laminated composite, the laminated composite having a plurality of ply layers, creating a repair patch, peeling and removing one or more of the plurality of ply layers having damage, and aligning and bonding the repair patch to the one or more of the plurality of ply layers remaining in the repair region. The method may further comprise mapping dimensions and arrangement of the plurality of ply layers forming the laminated composite. Each of the one or more of the plurality of ply layers having damage may be separately peeled and removed. Further, each of the one or more of the plurality of ply layers to be peeled and removed may be separately scored before peeling.

The repair patch may be created by forming a first layer that matches the mapped dimensions and arrangement of the plurality of ply layers forming the laminated composite, forming at least one additional layer that matches the mapped dimensions and arrangement of the plurality of ply layers forming the laminated composite, and aligning the first layer with the at least one additional layer. The number of layers forming the repair patch may be at least equal to the number of ply layers having damage that are separately peeled and removed.

Additional embodiments of the present disclosure may provide a method for repairing a laminated composite having a plurality of plies, the method comprising locating damage to one or more of the plurality of plies, the location of the damaged one or more of the plurality of plies forming a repair region, removing the damaged one or more of the plurality of plies from the repair region, affixing a sacrificial plug to the repair region, peeling and removing at least one layer of the sacrificial plug, and adding at least one replacement ply to the repair region. The sacrificial plug may be formed of the same material as the plurality of plies forming the laminated composite. The peeling and removing step and the adding at least one replacement ply step may be repeated until each layer of the sacrificial plug has been removed. The method may further comprise applying a patch after the sacrificial plug is affixed to the repair region, wherein layers of the patch may be peeled and removed concurrently with peeling and removing at least one layer of the sacrificial plug. In addition, the damaged one or more of the plurality of plies also may be removed through peeling.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure generally provide processes for repair of structures that may be fabricated using laminated composites, such as wing skins of aircraft structures. Laminated composites generally may be comprised of various ply layers wherein each layer may be impregnated separately and cured. Repair processes according to embodiments of the present disclosure may take advantage of the various ply layers within a laminated composite such that individual damaged plies may be peeled away and then replaced to preserve ply drops within the laminated composite.

Figure 1:
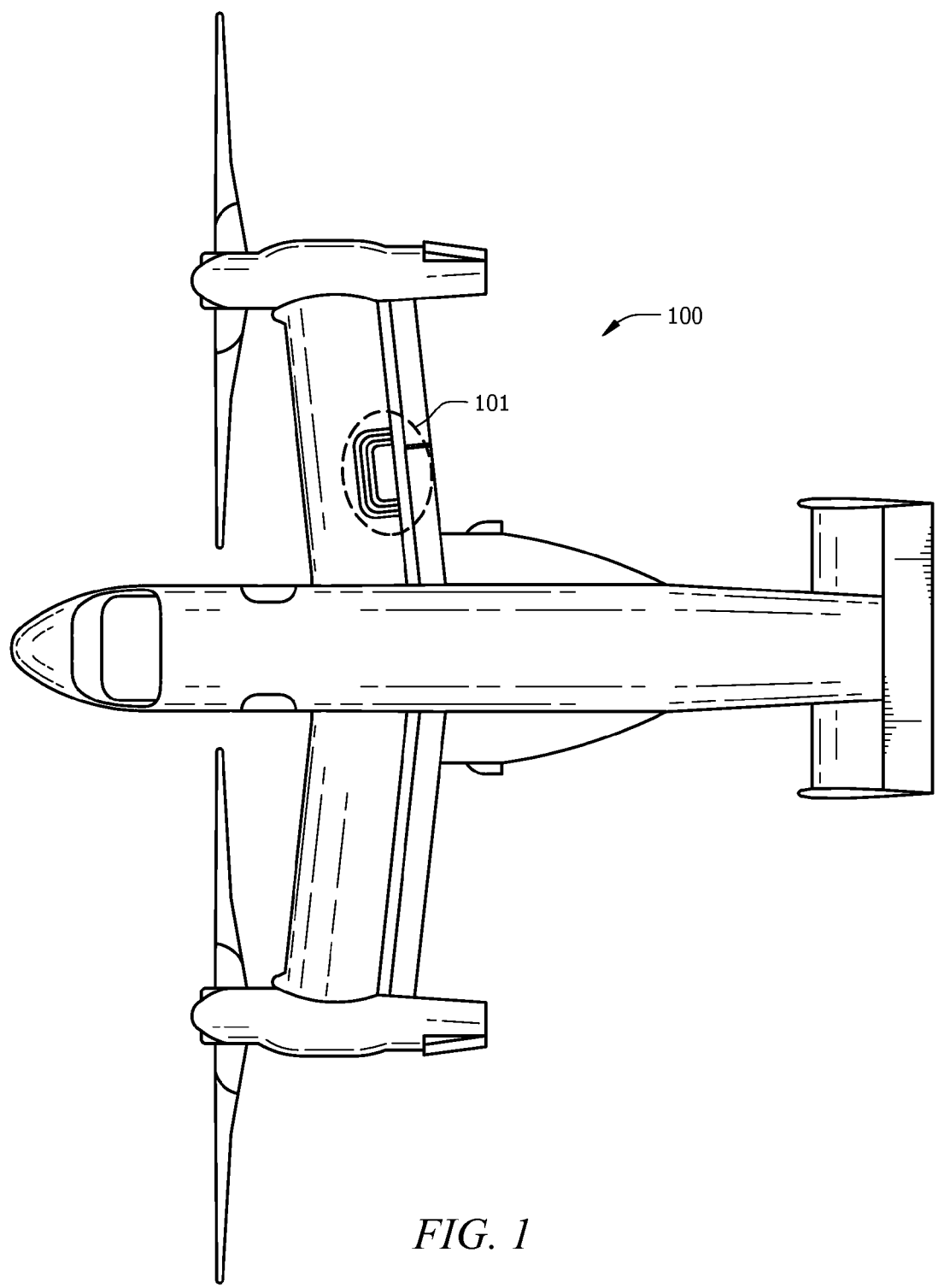
FIG. 1 depicts a repair area of an aircraft structure according to an embodiment of the present disclosure.

FIG. 1 depicts an embodiment of the present disclosure identifying repair area 101 of aircraft structure 100. Repair area 101 may be an area of aircraft structure 100 comprised of a laminated composite that may be damaged. While repair area 101 is shown on a portion of a wing of aircraft structure 100, it should be appreciated that processes for repair according to embodiments of the present disclosure may be employed in other areas of aircraft structure 100 without departing from the present disclosure.

Damage to repair area 101 generally may be repaired by peeling away individual plies of the laminated composite. Such peeling may exploit the weaker interlaminar properties of the laminated composite and achieve more precise control during removal of the plies. This is because peeling generally only may affect a single ply being removed at a given time at a precise location within repair area 101. Such precision in repair through use of peeling has not previously been provided through more conventional scarfing, sanding or cutting techniques insofar as the depth of the removed laminate composite plies may be controlled through removal by peeling one ply at a time. Peeling also may address variations in ply build-ups and ply drops as well as contouring within a repair area and any changes in surface layers of the larger structure where the repair region is identified. After one or more damaged plies have been removed through peeling, replacement plies may then be added to restore the capabilities of the area where the repair has been made. It should be appreciated that when replacement plies are added, they may be added in an overlapping manner so as to transfer the loads on a ply-by-ply basis. These repair processes may be performed using inexpensive tools and allow repairs to be made without the need for complete removal of a repair area from a larger structure. Accordingly, repair processes according to embodiments of the present disclosure may provide a low cost method for repair while maintaining the profile of a component within a larger structure.

Figure 2:
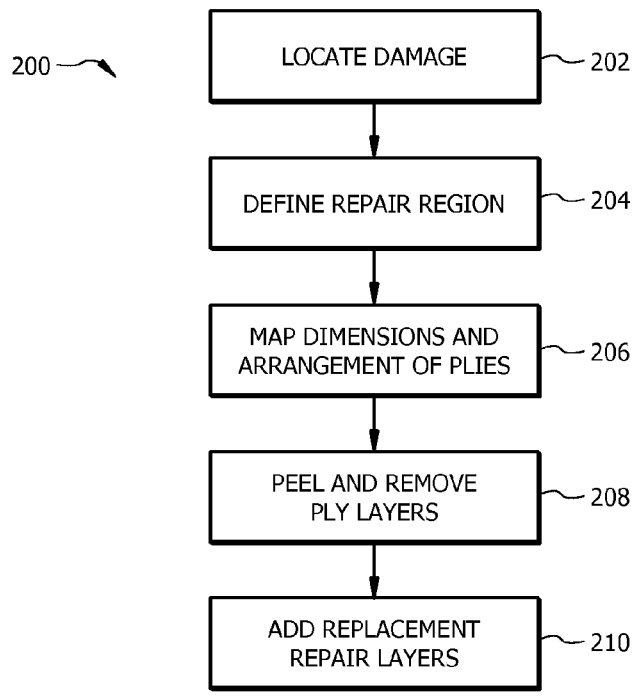
FIG. 2 depicts a process for repairing complex laminate composites according to an embodiment of the present disclosure.

FIG. 2 depicts process 200 for repairing complex laminated composites according to an embodiment of the present disclosure. In step 202, damage to the complex laminated composite may be located. This may involve identification of the edge of damage, the extent of the damage, and the composition of the laminated composite used in the original fabrication. This is an improvement over traditional sanding or routing methods in that, if damage carries through multiple ply layers, the damage may be repaired in a manner that addresses the contour of a repair area as well as the complex geometry of the laminated composite. Thus, process 200 may control and maintain such geometry through the course of a repair.

The repair region of the complex laminated composite may be identified in step 204. The dimensions and arrangement of plies may be mapped in step 206. In step 208, the ply layers may be peeled and then removed. Such peeling and removal may occur on a ply-by-ply basis. It should be appreciated that the plies may be scored before peeling occurs to better permit manipulation of the ply layers one at a time. Once the plies have been scored, it may be easier to take hold of the fibers within a ply to begin the peeling process. Such scoring may be done one layer at a time through use of, for example, a sharp knife.

Finally, in step 210, replacement repair ply layers may be added. When replacement repair ply layers are added, the number of replacement ply layers may generally match the number of damaged ply layers that were peeled and removed in step 208. Accordingly, the repair ply layers may match ply for ply the damaged ply layers that have been peeled and removed. It should be appreciated that the number of replacement repair ply layers may not always equal the number of plies that have been peeled and removed but may generally be at least equal to the number of damaged ply layers. In some embodiments of the present disclosure, additional plies may be added beyond the number of damaged ply layers peeled and removed to provide more strength within and around a repair area. Further, in certain embodiments of the present disclosure, the number and type of replacement repair ply layers added may differ depending on the contour of the repair area. For example, the number of ply layers to be added may be tapered as the contour of aircraft structure 100 within repair area 101 changes. Further, extra ply layers may be added to each side of an area to be repaired in order to better ensure strength of the repair area while still maintaining desired tolerances. However, it should be appreciated that processes for repair according to embodiments of the present disclosure may be performed without the addition of extra ply layers. In addition, it should be appreciated that if extra ply layers are to be added, there is no limitation as to the number of ply layers that may be added as long as the proper tolerances are maintained. This is an improvement over more traditional sanding repair in that ply layers may now be traced during repair.

Figure 3:
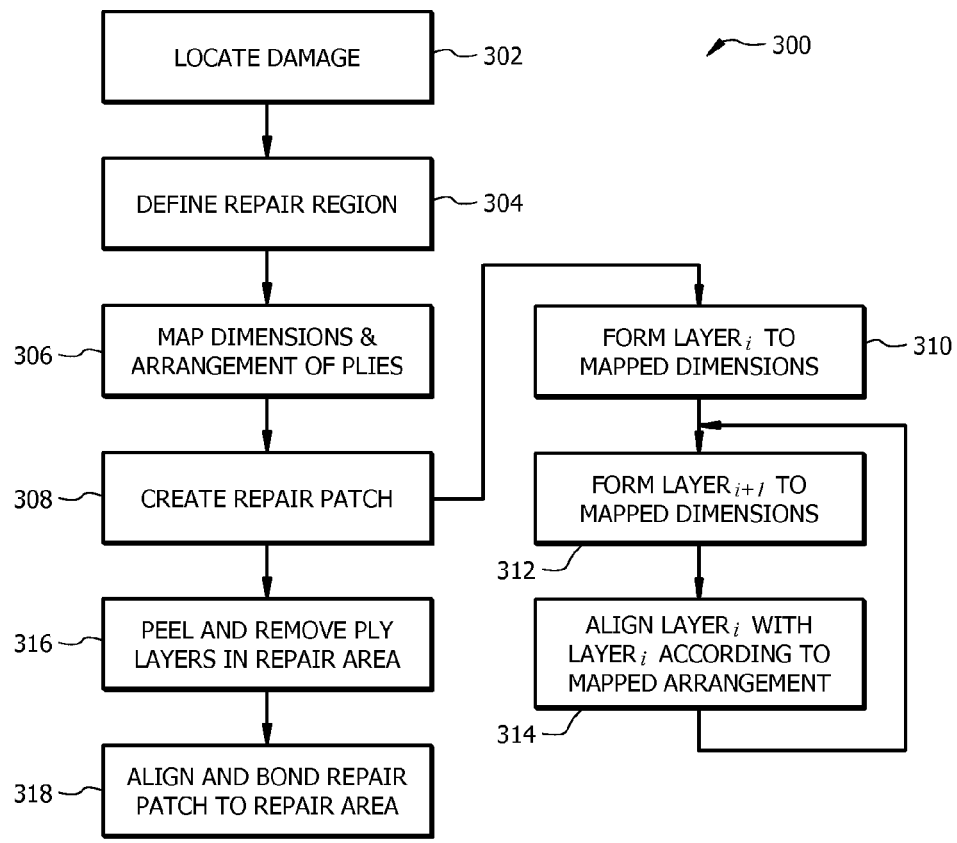
FIG. 3 a further process for repairing complex laminate composites according to an embodiment of the present disclosure.

FIG. 3 depicts process 300 for repairing complex laminated composites according to another embodiment of the present disclosure. Similar to process 200 of FIG. 2, in step 302, damage to the complex laminated composited may be located, the repair region of the complex laminated composite may be identified in step 304, and the dimensions and arrangements of plies may be mapped in step 306. However, process 300 may diverge at step 308 when a repair patch may be created. In order to create a repair patch, $layer_i$ may be formed to mapped dimensions in step 310. $Layer_{i+1}$ may then be formed to conform to the mapped dimensions in step 312. In step 314, $layer_i$ may be aligned with $layer_{i+1}$ according to the mapped arrangement so as to ensure adequate load transfer across plies. It should be appreciated that steps 312 and 314 may be repeated as many times as appropriate depending on the number of ply layers that may be needed to make the repair according to embodiments of the present disclosure. Further, process 300 allows all ply drops to be preserved so that when the repair patch is inserted, the ply drops may be matched on a ply for ply basis.

It also should be appreciated that, as previously described, peeling allows for tracing of ply tapers which is an improvement over sanding. Accordingly, peeling allows all ply drops to be preserved so that the repair patch may be formed to better match ply for ply the ply layers that may be removed through peeling. Once the layers of the repair patch have been created, in step 316, ply layers in the repair area may be peeled and removed. Finally, in step 318, the repair patch may be aligned and bonded to the repair area.

Figure 4:
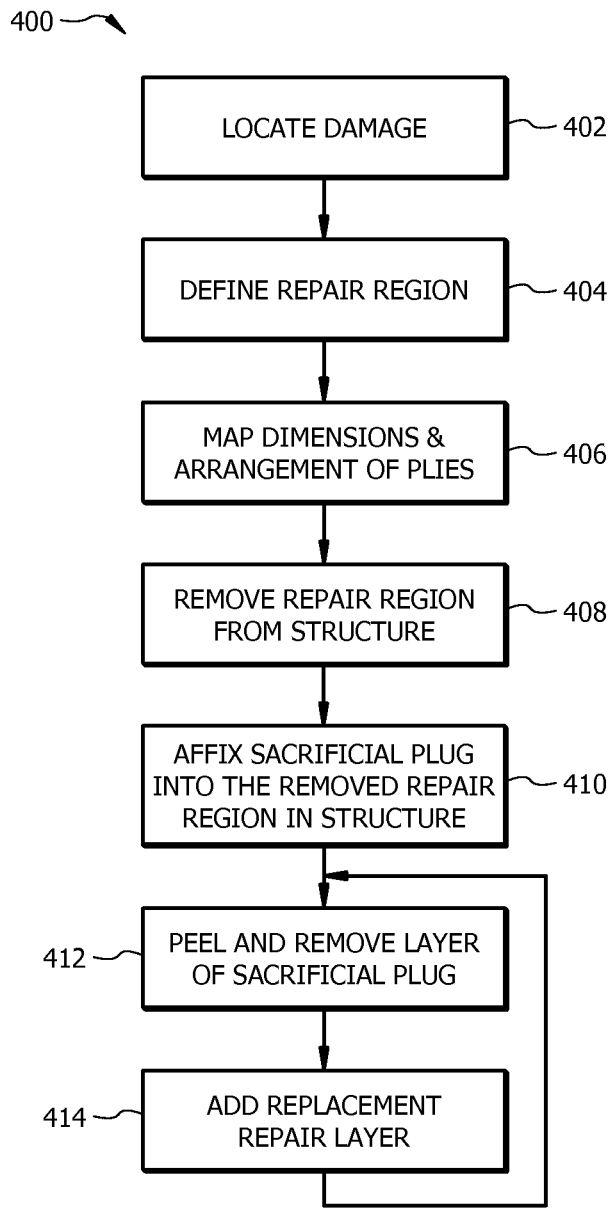
FIG. 4 depicts a further process for repairing complex laminate composites according to an embodiment of the present disclosure.

FIG. 4 depicts process 400 for repairing complex laminated composites according to another embodiment of the present disclosure, such as when damage may extend through the thickness of the composite. In step 402, damage to one or more of a plurality of plies may be located. A repair region comprising the location of the damaged one or more of a plurality of plies may be defined in step 404, and the dimensions and arrangement of plies may be mapped in step 406. In step 408, the damaged one or more of the plies repair region may be removed from the repair region of the structure. A sacrificial plug may be affixed into the repair region in the structure in step 410. It should be appreciated that the plug may be formed of materials similar to those found in the repair region to match the material that is removed from the structure, and the plug may be formed of a thickness to extend through the repair region as deeply as may be needed to effectuate the repair. Use of such a plug may allow plies to be replaced while still maintaining the contour of the repair area and surrounding region. At least one layer of the sacrificial plug may then be peeled and removed in step 412. Thus, the plug layer may be removed in process 400 so that the damaged plies may be replaced with new ones more easily. At least one replacement repair ply layer may then be added in step 414. It should be appreciated that the steps of peeling and removing layers of the sacrificial plug (step 412) and adding the at least one replacement repair ply layer (step 414) may be repeated as many times as there are layers of the sacrificial plug to be removed. It also should be appreciated that once the plug is bonded into the repair region, a patch also may be applied and then peeling may be utilized on both the plug and the patch without departing from the present disclosure. Further, according to certain embodiments of the present disclosure, the plug may be self-removing or it may be peeled away after the at least one replacement repair ply layer has been added if the plug is still remaining when the one or more replacement repair ply layers are in place.

It should be appreciated that, similar to the sacrificial plug, a temporary caul plate may also be used to capture the shape of the structure and to maintain the contour of a repair area during repair processes according to embodiments of the present disclosure. Such a temporary caul plate may provide stiffening properties during the repair in order to maintain the desired dimensional configuration following completion of the repair process. A caul plate may be bonded to the surface using small squares of adhesive as compared to coating the entire plate with adhesive in order to allow the small squares to be sanded off more easily.

The repair processes according to embodiments of the present disclosure have been described largely in the context of repairing a wing skin having complex laminate composite geometry that was previously considered to be unrepairable. However, it should be appreciated that repair processes according to embodiments of the present disclosure may be utilized to repair structures other than wing skins and/or structures other than aircraft structures. Accordingly, these repair processes may be utilized when laminated composites having complex geometry, contour changes, and/or when ply drops are involved without departing from the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for repairing a laminated composite, the method comprising:
   mapping dimensions and arrangement of a plurality of plies forming the laminated composite;
   defining a repair region by identifying at least one of the plurality of plies that is damaged;
   scoring the one or more damaged plies before peeling occurs, wherein fibers within the one or more damaged plies are taken hold of to begin peeling and removing the one or more damaged plies, wherein the scoring is performed in such a way that the one or more damaged plies are not completely cut through;
   peeling and removing the one or more damaged plies from the repair region,
     wherein each of the one or more damaged plies is separately peeled and removed; and
   adding at least one replacement ply to the repair region,
     wherein the number of replacement plies added is at least equal to the number of damaged plies that are separately peeled and removed so as to preserve ply drops within the laminated composite, and
     wherein the number of replacement plies match ply for ply the damaged plies that have been separately peeled and removed.

2. The method of claim 1 wherein each of the one or more damaged plies to be peeled and removed is separately scored before peeling.

3. The method of claim 1 further comprising:
   creating a repair patch; and
   aligning and bonding the repair patch within the repair region.

4. The method of claim 3, the step of creating the repair patch further comprising:
   forming a first layer that matches the mapped dimensions and arrangement of the plurality of plies forming the laminated composite;
   forming at least one additional layer that matches the mapped dimensions and arrangement of the plurality of plies forming the laminated composite; and
   aligning the first layer with the at least one additional layer.

5. The method of claim 1 wherein the at least one replacement ply is added in an overlapping manner.

6. The method of claim 1 wherein the number of replacement plies added is greater than the number of damaged plies that are separately peeled and removed.

7. The method of claim 1 wherein additional replacement plies are added to each side of the repair region to further strengthen the repair region.

\* \* \* \* \*